Aug. 11, 1959      F. W. WELLS      2,898,768

TRENCHER TRANSMISSION

Original Filed March 29, 1950      2 Sheets-Sheet 1

FRANK W. WELLS,
INVENTOR.

BY

ATTORNEY

Aug. 11, 1959  F. W. WELLS  2,898,768
TRENCHER TRANSMISSION
Original Filed March 29, 1950  2 Sheets-Sheet 2
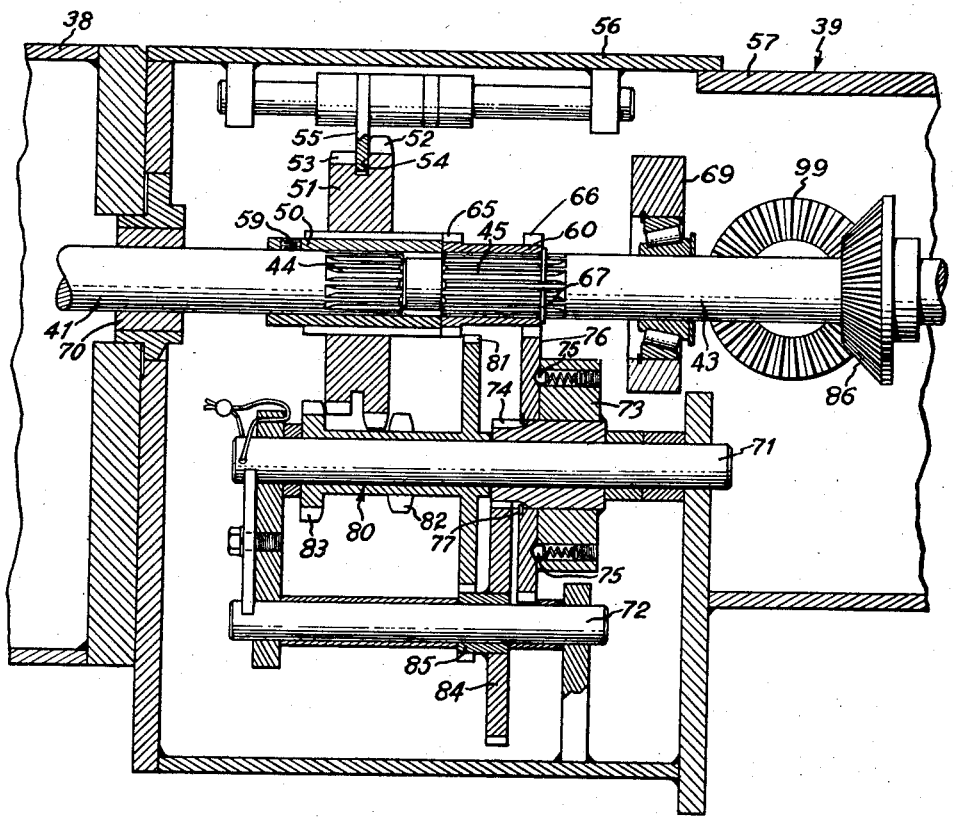
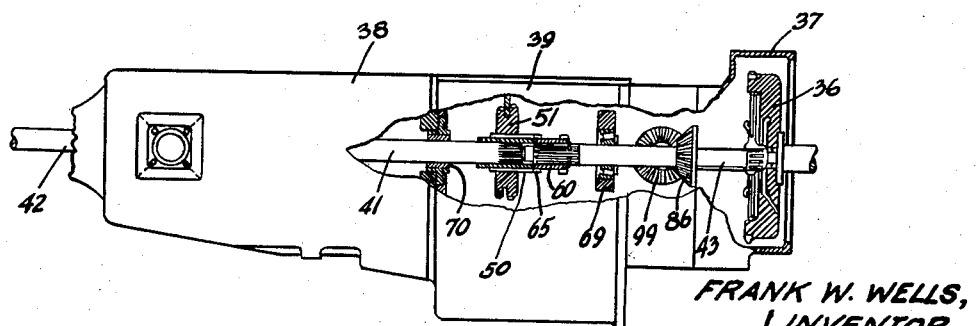
FRANK W. WELLS,
INVENTOR.
BY
ATTORNEY United States Patent Office 2,898,768
Patented Aug. 11, 1959

2,898,768

TRENCHER TRANSMISSION

Frank W. Wells, Pasadena, Calif.

Original application March 29, 1950, Serial No. 152,611, now Patent No. 2,762,137, dated September 11, 1956. Divided and this application September 10, 1956, Serial No. 608,951

3 Claims. (Cl. 74—15.84)

This invention relates to automotive power transmissions and is particularly useful in a tractor mounted trenching machine.

This application is a division carved out of my copending application Serial No. 152,611 filed March 29, 1950, on a Combination Grading and Trenching Machine, issued on September 11, 1956 as Patent No. 2,762,137.

Design problems met with in mounting a trenching machine on a standard wheeled farm tractor include the unsuitability of the standard tractor transmission for driving the drive wheels thereof and the trenching wheel with that degree of flexibility which is required to adapt the machine to digging in soils of varying degrees of hardness.

It is an object of the present invention to provide a secondary transmission adapted to be associated with the standard transmission of a tractor which will afford the option of either driving the tractor wheels through the standard transmission or driving said wheels through both said standard transmission and said secondary transmission thereby attaining a substantial number of additional gear ratios.

Another object of the invention is to provide a novel secondary transmission wihch can be interposed between the drive clutch and the standard transmission of an automotive vehicle with a minimum amount of reconstruction of the latter.

A further object of the invention is to provide such a secondary transmission having a relatively simple unitary control mechanism by the manual operation of which a selection may readily be made between excluding said transmission from the drive system of the tractor or cutting it into said system to effect one or another of a plurality of gear drive ratios different than those afforded by the standard tractor transmission.

When adding gear drive ratios to the drive system of an automotive vehicle of a substantially lower order than the lowest ratio at which the vehicle is designed to operate, there is a possibility of overstraining, to the point of distortion or fracture, the drive elements driven by the transmission.

A yet further object of the invention is to provide a transmission as aforesaid which will include a safety means for automatically discontinuing the drive through said transmission when the torque produced thereby increases to a point approaching a safe operating maximum.

Still another object is to provide such a safety means which will produce a vibration or sound at spaced intervals when functioning to discontinue said drive which will serve as a warning that an excessive torque value has been reached, thus enabling the operator to make immediate adjustment of the drive system to eliminate this.

Another object of the invention is to provide such a transmission embodying a power take-off for driving a trenching wheel, said take-off enabling the operator to substantially increase the speed of rotation of said wheel at will to relieve an excessive torque condition in the drive of the tractor without any change being made in the presently effective gear ratio of the tractor drive system.

The manner of accomplishing the foregoing objects as well as further objects and advantages will be made manifest in the following description taken in connection with the accompanying drawings in which Fig. 1 is a diagrammatic fragmentary perspective view of a preferred embodiment of the invention incorporated with a standard tractor drive system between the clutch and the transmission thereof.

Fig. 3 is an enlarged longitudinal sectional view taken on the line 3—3 of Fig. 1.

Fig. 4 is a diagrammatic side elevational view of the clutch and transmission means of the invention, taken in the direction of arrow 4 in Fig. 1, portions of the housing being broken away in this view to illustrate the internal construction.

Figure 2:
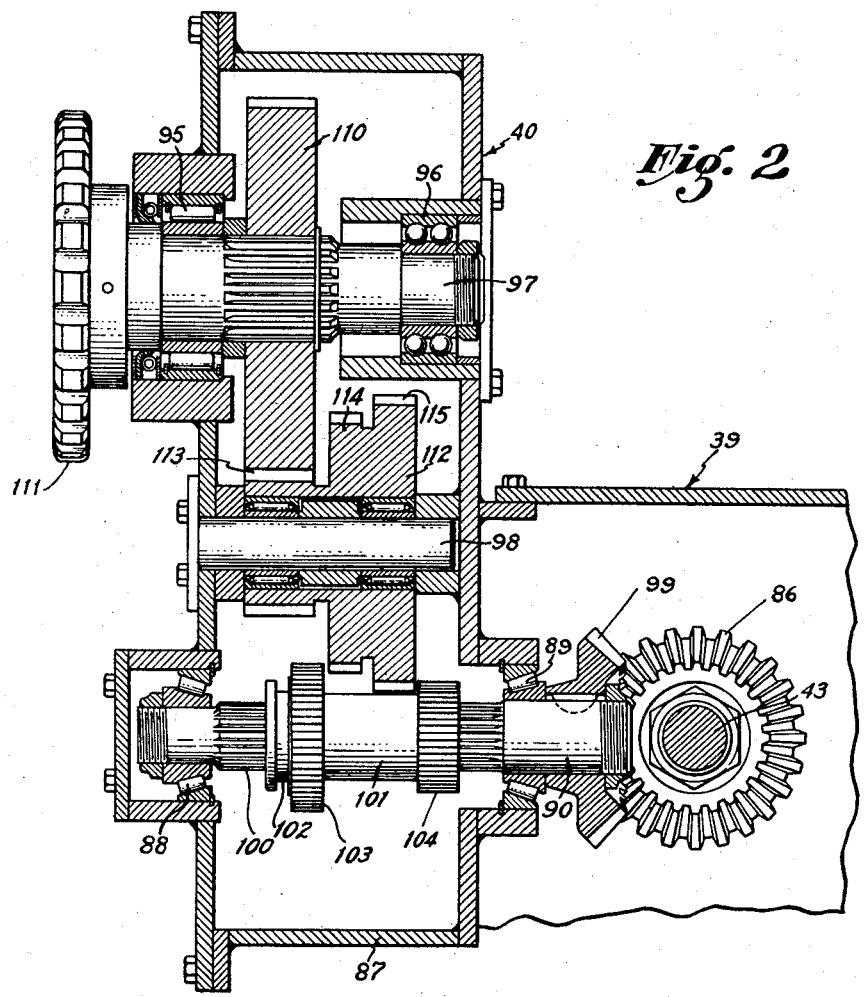
Fig. 2 is an enlarged transverse sectional view through the power take-off of the invention on line 2—2 of Fig. 1.

Referring specifically to the drawings, the invention is there shown as comprising a power transmission or drive system 28. This includes a clutch 36 encased in a housing 37 and a standard transmission 38 which clutch and transmission (normally close-coupled together) are here separated to receive a secondary transmission 39 therebetween which unites said clutch and standard transmission to form said drive system 28.

Also united with the secondary transmission 39 is a variable speed power take-off 40 through which power from the clutch 36 is transmitted to the rotary trenching wheel of a tractor mounted trencher (not shown) in which the invention is particularly useful.

The original transmission 38 retains a shaft 41 which was originally driven by a connection between this shaft and the engine clutch 36. It also retains the gear trains and control means by which shaft 41 is connected with a drive-shaft 42 leading to the rear wheels of the tractor. These gear trains (not shown) provide for four speeds forward and one speed in reverse.

The second transmission 39 provides a means for making a direct connection between the clutch 36 and the shaft 41 of transmission 38. It also includes means for introducing various gear trains between the clutch 36 and shaft 41 so as to modify the speed ratios optionally provided by original transmission 38 and with which the rear wheels are driven from the clutch.

Fig. 3 clearly illustrates transmission 39 as including a shaft 43 which connects at its front end with the clutch 36, and the rear end of which is in coaxial alignment with and abuts against the shaft 41 at B. Close to their abutting ends, the shafts 41 and 43 are provided with splines 44 and 45. Fitting over the spline 44 is a sleeve 50 which is internally splined to fit the spline 44 and externally splined to fit a double gear 51 having external teeth 52 and 53 on opposite sides of an external groove 54, the two sets of teeth 52 and 53 being of different pitch radius. A yoke 55 slidably mounted on a cover plate 56 of a housing 57 of the secondary transmission 39 extends into the groove 54 and is actuated by a manual control lever 58 (Fig. 1) to shift the double gear 51 axially on the spline sleeve 50.

The sleeve 50 is secured in place on the shaft 41 by a screw 59 to prevent endwise movement of said sleeve.

Slidably fitting the spline 45 is an internally splined sleeve 60. Provided externally on sleeve 60 at opposite ends thereof are pinion gears 65 and 66. The teeth of the gear 65 corresponds to those of the external spline on sleeve 50 so that double gear 51 is adapted to be slid along said sleeve until it receives the teeth of gear 65 whereupon gear 51 functions as a coupling, locking shafts 43 and 41 and forming a direct drive connection between the motor 27 and original transmission 38.

The sleeve 60 is held in end-to-end engagement with the sleeve 50 by a split-spring ring 67 which snaps into an annular recess provided therefor in the spline 45.

The housing 57 for secondary transmission 39 includes a bearing 69 in which shaft 43 journals and a bearing 70 in which shaft 41 journals. This housing also provides mountings for stationary jack shafts 71 and 72. Rotatable on the jack shaft 71 is a double gear 73 having a pinion gear 74, spring detents 75, and a plate gear 76 which is recessed and held against the detents 75 by a ring 77 trapped in a suitable annular recess provided in the gear 73 at the base of the pinion 74. The gear 76 is in constant mesh with pinion gear 66 and is constantly driven thereby. Also mounted on jack shaft 71 is multiple gear 80 having gears 81, 82 and 83 formed thereon. Gear 82 is formed to mesh with gear 52 when the latter is placed in radial alignment therewith and gear 83 is formed to mesh with gear 53 when the latter is radially aligned therewith.

Provided on shaft 72 is a gear 84 which meshes with pinion 74 and has a pinion 85 which meshes with gear 81. It is thus seen that by manipulation of lever 58 (Fig. 1) the option is provided to operator, through control of the secondary transmission 39, of either locking shaft 43 to shaft 41 for direct drive and cutting out the secondary transmission 39, or, by shifting the gear 51 to mesh either gear 52 with gear 82, or gear 53 with gear 83, to provide forward speeds for the tractor at creeping rates which can be further modified by interposing between the shaft 41 and the shaft 42 one or another of the gear trains available in the original gear transmission 38.

Figure 1:
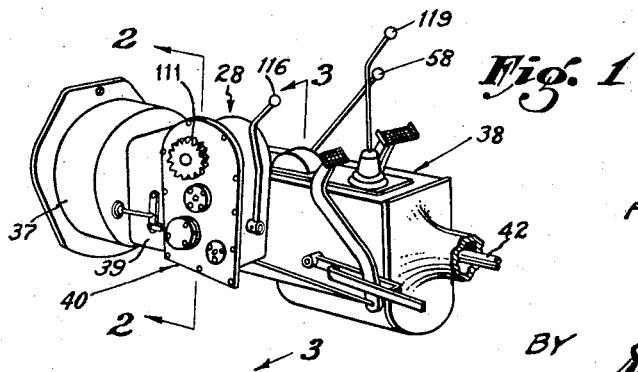

The shaft 43 has fixed thereon a miter gear 86 from which the take-off 40 is driven. This take-off includes a housing 87 mounted on one side of the secondary transmission 39 and providing bearings 88 and 89 in which a shaft 90 journals and bearings 95 and 96 in which a shaft 97 journals. Mounted in the housing 87 in an intermediate position between and parallel with the shafts 90 and 97 is a stationary shaft 98. Fixed on one end of shaft 90 is a miter gear 99 which meshes with gear 86. The shaft 90 has a spline 100 with which a double gear 101 is slidably meshed, said gear having a yoke groove 102 and gears 103 and 104 of different diameters. Shaft 97 has fixed thereto a gear 110 and a sprocket 111, the latter being outside the housing 87. Rotatably mounted on shaft 98 is a triple gear 112 having formed integral therewith a pinion 113 which constantly meshes with gear 110, and gears 114 and 115 of different diameters and which are adapted to be brought respectively into mesh with gears 103 or 104 by the application of a yoke (not shown) which fits into the yoke groove 102 and which is operable by lever 116 to shift gear 101 axially (Fig. 1).

It is thus clear that rotation of shaft 43 is always transmitted through gears 86 and 99 to shaft 90, and that by actuation of lever 116 the operator of the grader and trencher may optionally cause the sprocket 111 to be rotated at either of two speeds (depending upon which of the gears 103 or 104 is placed in mesh with the gear 112) or, by placing the gear 101 as shown in Fig. 2, the drive between the shaft 43 and the sprocket 111 may be disconnected.

From the above description it is clear that the present invention provides a means of adding a number of new speed changes to those previously available through manipulation of the transmission 38. It is also clear that use of these changes is optional in that shifting of gear 51 into interlocking relation with gear 65, which is coaxial therewith, directly connects clutch 36 with the original transmission 38, completely by-passing secondary transmission 39.

This facility is afforded with a minimum amount of reconstruction of the original drive system by simply dividing the main drive shaft between clutch 36 and transmission 38, taking off power from the shaft section leading from the clutch, and returning said power, after it has passed through a selected train of gears in the secondary transmission 39, to the shaft section leading to the transmission 38.

The simplicity of the secondary transmission 39 is enhanced by utilizing the gear 51 and the shift lever 58 for actuating this, to perform three functions, to wit: first effecting the drive gear ratio changes in the secondary transmission; second neutralizing said transmission by severing all connection between the divided portions of the main drive shaft; and third neutralizing the secondary transmission by uniting said divided shaft portions for establishing a direct drive along said shaft from the clutch 36 to the original transmission 38 and completely by-passing the secondary transmission 39.

The detents 75 are located at the power input end of the secondary transmission 39 so as to be able to perform their function of transmitting power through the secondary transmission 39 while yielding to a relatively low aggregate torque stress applied to said detents when an overload occurs in the torque delivered by said transmission to drive shaft portion 41.

When detents 75 thus yield, there is relative rotation between double gear 73 and its individual gear 76 which produces a snapping noise each time the detent balls are allowed to return into the detent recesses in gear 76. This serves as a warning to the operator of the excessive resistance to rotation of shaft 41. In a tractor mounted trenching machine, the trenching wheel is driven from sprocket 111 of power take off 40 while the tractor drive wheels are driven by drive shaft 42 which is driven in turn by shaft 41.

Take-off 40 embraces a separate two-speed gear transmission operable by lever 116, by the actuation of which, this transmission may either be neutralized or set to operate through one or the other of two different drive ratios. This permits normal operation of the trenching wheel at the lower of these drive ratios so that when an overload occurs on the drive system for driving the tractor wheels (which is announced by the snapping noise produced by the yielding of detents 75) the operator merely needs to shift lever 116 to use the higher gear ratio in power take-off 40 causing a speeding up of the rotation of the trenching wheel in order to relieve back pressure on the tractor drive wheels and remove the cause of the delivered torque overload.

In this manner a temporary overloading of the tractor drive wheels may be relieved without changing the settings of the transmissions 38 and 39, and, after the digging condition causing the overload is past, the power take-off 40 may be shifted back to the lower drive ratio for driving the trenching wheel.

In the illustrated embodiment of the invention, a clutch 36 is indicated as a torque connection between an engine and a transmission. The term "clutch" is not to be construed in a limited sense, where this occurs in the claims, however, as other torque connectors such as the well known torque converter could be readily substituted for clutch 36 in the illustrated embodiment of the invention.

While only a single embodiment of the invention is disclosed herein, this is understood to be for illustrative purposes only and susceptible of numerous modifications without departing from the spirit of the invention or the scope of the appended claims.

The claims are:

1. In a transmission for interposing multiple gear drive ratios between adjacent coaxial input and output portions of a divided shaft, the combination of: a drive gear mounted on the input portion of said divided shaft; a driven gear mounted on the output portion of said divided shaft; jack shaft means parallel with said divided shaft; a series of gears mounted on said jack shaft means, an endmost gear of said series meshing with said drive gear, said series forming a gear train; means for optionally bringing said driven gear into mesh with one or the other of different gears in said gear train; and releasable detent torque limiting means connecting said endmost gear of said series of gears coaxially with the next adjacent gear in said train, said means yielding to temporarily disconnect said gears when the torque between the same exceeds a given value.

2. In a power transmitting system adapted for use in an automotive tractor having a trenching machine mounted thereon and a motor for coordinately driving said tractor and said trenching machine, the combination of: a clutch driven by said motor; transmission means including a primary transmission and a secondary transmission, said primary transmission having an output shaft adapted to drive said tractor; an input shaft; a drive shaft connected to said clutch and in coaxial abutment with said input shaft; a power take-off from said drive shaft; and means for connecting said secondary transmission with juxtaposed coaxial portions of said input shaft and drive shaft to selectively impose different speed ratios of relative rotation upon said input shaft and drive shaft, one of said speed ratios being the ratio of one-to-one.

3. A combination as in claim 2 in which said juxtaposed input and drive shaft portions are provided with corresponding coaxial splines; a gear axially shiftable on that spline which is in a driven relation with the other of said splines; and a gear train driven by the shaft portion carrying the drive spline and disposed to be engaged selectively by said shiftable gear to set up different drive ratios between said input and drive shafts, said shiftable gear being shiftable out of engagement with said gear train and in simultaneous engagement with said two splines thereby locking said input and drive shafts in direct drive relation, and by-passing said secondary transmission.

References Cited in the file of this patent

UNITED STATES PATENTS

| | | |
|---|---|---|
| 1,297,755 | Vincent | Mar. 18, 1919 |
| 1,310,935 | Storle | July 22, 1919 |
| 1,772,247 | Forrester et al. | Aug. 5, 1930 |
| 1,775,611 | White | Sept. 11, 1930 |
| 2,489,699 | Clark | Nov. 29, 1949 |
| 2,521,729 | Keese | Sept. 12, 1950 |